United States Patent [19]

O'Toole et al.

[11] 4,354,475

[45] Oct. 19, 1982

[54] AUXILIARY SUPPLY SYSTEM

[75] Inventors: James P. O'Toole, Vancouver, Wash.; James L. Mylar, Cheyenne, Wyo.

[73] Assignee: Lazy S. Mining and Development Corp., Cheyenne, Wyo.

[21] Appl. No.: 101,462

[22] Filed: Dec. 10, 1979

[51] Int. Cl.³ .......................................... F02M 31/00
[52] U.S. Cl. .................................. 123/525; 123/577; 261/23 A
[58] Field of Search ............... 123/577, 578, 575, 557, 123/525, 522, 523, 524, 582, 583, 584, 590, 556; 261/23 A, 23 R, 96, 41 A, 71

[56] References Cited

U.S. PATENT DOCUMENTS

| | | | |
|---|---|---|---|
| 1,889,270 | 11/1932 | Thomas | 123/552 |
| 1,973,889 | 9/1934 | Timian | 123/593 |
| 2,119,927 | 6/1938 | Reid | 123/590 |
| 2,315,881 | 4/1943 | Thomas | 123/525 |
| 2,355,716 | 8/1944 | Ericson | 123/579 |
| 2,430,693 | 11/1947 | Udale | 261/23 A |
| 2,473,808 | 6/1949 | Mallory | 123/552 |
| 2,661,269 | 12/1953 | Briggs | 123/593 |
| 2,798,703 | 7/1957 | Carlson | 123/579 |
| 3,942,499 | 3/1976 | Kunik | 123/592 |
| 4,079,715 | 3/1978 | Masaki | 123/556 |
| 4,186,706 | 2/1980 | Matsumoto | 123/432 |
| 4,257,380 | 3/1981 | Bendig | 123/556 |

*Primary Examiner*—Ronald H. Lazarus
*Attorney, Agent, or Firm*—Hugh H. Drake

[57] ABSTRACT

An internal combustion engine has a carburetor, with a throttle valve and a choke valve, that delivers a fuel-air mixture to the intake manifold. An auxiliary system uses a blending chamber which feeds the manifold exclusive of the engine carburetor and through a metering valve that responds to engine vacuum level for controlling the amount of blend drawn through the blending chamber. At the inlet of the blending chamber is an atomizing throat fed with fuel and air. The drawing of the blend from the outlet of the chamber draws air through the throat and into comminglement with liquid fuel which is atomized by action of the throat. Under normal operating conditions and adjustment, the auxiliary system improves engine performance by increasing fuel economy and reducing engine exhaust pollution.

27 Claims, 7 Drawing Figures

Fig_1

Fig_2

Fig_3

Fig_4

Fig_5

Fig_6

Fig_7

AUXILIARY SUPPLY SYSTEM

The present invention pertains to an auxiliary supply system for an internal combustion engine. More particularly, it relates to a system which supplies additional energy to an internal combustion engine that otherwise operates normally under control of its own carburetion system.

The ordinary internal combustion engine has a carburetor or equivalent arrangement which supplies a fuel-air mixture to the intake manifold of the engine. Air and liquid fuel are drawn through an internal throat within the carburetor by a vacuum created within the manifold as the fuel-air mixture is drawn therefrom into combustion chambers of the engine. Included in the passage through the carburetor is a throttle that selectively varies the quantity of the mixture supplied to the manifold and a choke which selectively changes the ratio between fuel and air in the mixture supplied. The vacuum created within the intake manifold often is used also for the purposes of controlling operation of the ignition distributor in relation to engine speed and load as well as for other purposes such as recycling engine-produced pollutants for additional burning and sometimes for operating other apparatus such as windshield wipers.

In recent years, considerable concern has developed with respect to the air pollution caused by materials present in the exhaust gases emitted by internal combustion engines. In an attempt to meet the problem, severely restrictive government regulations have been imposed and enormous costs have been incurred in connection with research, development, testing, equipment and maintenance. While improvements have been forthcoming, the cost to users, as well as to other taxpayers, has been tremendous.

For a long time, substantial effort also has been devoted to achieving better fuel economy in the operation of internal combustion engines. With substantially rising fuel costs during the last few years, that effort has been greatly increased. Here again, government regulations have been imposed with the stated intent of forcing the accomplishment of the desired result. While improved fuel economies have been obtained in many cases, savings in this respect often are at least mitigated by a significant increase in related costs that ultimately are paid once more by the users and other citizens.

Unfortunately, the approaches often adopted for reducing pollution are at cross purposes with the approaches taken for improving fuel economy. Besides increasing initial costs, many of the pollutant control systems used have seriously impaired engine operation with respect to its economy in the use of fuel. Some approaches have boosted costs to the user by requiring the purchase of fuel in a grade which is more expensive. Another significant group of persons adversely affected have been those who prefer to service and make at least minor repairs and adjustments on their own engines. Often, the complexities of the equipment added for purposes of achieving reduction of pollution and increased fuel economy, together with regulations pertaining to adjustment of such equipment, have prohibited such would-be self-sufficient persons from performing their own work.

A mere glance through the classified prior art at the U.S. Patent and Trademark Office will reveal the existence of many hundreds, if not thousands, of patents that have issued on disclosures having an objective of reducing pollution caused by or improving fuel economy of internal combustion engines. Indeed, many prior approaches have yielded a degree of improvement in one respect or another. A few have even been adopted into somewhat widespread use. However, most have been discarded for any of a number of different reasons which include excessive cost, restriction in adaptability to more than only a very specific model of engine, adverse affect upon other engine functions and many others.

Nevertheless, a number of techniques previously suggested have attracted at least momentary interest. Generally, it has been recognized by many that improvement in the completeness of combustion of the mixture ought to result in both an increase in fuel economy, by obtaining more power from a given amount of fuel, and more thorough burning of the entire mixture to reduce exhaust pollutants. To that end, many attempts have been made to add heat to, increase turbulence in and otherwise act upon the mixture for the purpose of increasing the degree of vaporization of the fuel which the ordinary carburetor delivers as atomized particles commingled with the air.

Many prior techniques have depended directly or indirectly upon heat developed by the engine for raising the temperature level of the mixture, and some have operated or controlled their additional equipment by use of the vacuum developed within the engine in operation, U.S. Pat. No. 3,738,334—Farr, for example, vaporizes gasoline with exhaust heat. After his engine has reached a normal operating temperature, that vapor is introduced into the throat of what may be an otherwise conventional carburetor. In some cases, the auxiliary equipment has been in a form for adaptation as an add-on to an otherwise conventional carburetion system. For example, it is known to mount a vaporizing assembly physically between the ordinary carburetor and the intake manifold.

Instead of incorporating modifications directly into the engine's carburetor or modifying the mixture it processes externally to the intake manifold of the engine, some prior art approaches have sought improvement by the use of strictly auxiliary equipment which, in a sense, parallels the standard carburetor to feed an additional combustible mixture directly into the intake manifold. Believed to be exemplary are U.S. Pat. Nos. 2,715,392—Grevas, 3,739,760—Charron and 4,019,477—Overton. Grevas employs manifold vacuum to draw air into gasoline within a supplemental fuel tank and create air bubbles. Particles of fuel vapor are said to cling to the air bubbles, which are drawn into the manifold to improve fuel economy as well as performance during acceleration. Charron feeds a supplemental fuel-air mixture into the intake manifold from a system the control of which depends upon engine coolant temperature as well as upon the motion and position of the throttle valve within a standard carburetor. Overton mixes air and alcohol in an auxiliary carburetor and supplies that mixture directly to the engine during idle and light-load conditions. While perhaps attractive in a limited respect, all of these approaches suffer from one or more of lack of adjustable control, the requirement of a separate fuel reservoir, undue additional equipment, complexity of control or improvement only at other than higher speeds when most fuel is used. Different ones of these and other prior art systems also suffer in overall performance by producing such unwanted effects as reduction in overall volumetric efficiency of the engine or, at least during certain operational conditions, creating an excessively lean mixture which may harm the engine.

It is a general object of the present invention to provide a new and improved system for supplying additional energy to an internal combustion system in a manner which increases fuel economy and reduces exhaust pollutants.

Another object of the present invention is to provice a new and improved supply system which is capable of being either adapted easily to an existing system or initially manufactured as part of the original engine system.

A further object of the present invention is to provide an auxiliary supply system that requires essentially no modification of an otherwise standard engine, including its carburetor, other than normal adjustment thereof.

A specific object of the present invention is to provide a new and improved auxiliary system that avoids reduction of the volumetric efficiency of the engine or operation of the engine with an excessively lean fuel-air mixture.

It is also an objective to achieve the described benefits without the need for other than a modest investment for additional equipment and essentially no cost of operation.

As implemented to be merely added to an existing engine, it is a further objective to make that possible for an average user employing only one or two common tools for installation of the additional equipment.

The invention is thus intended for use with an internal combustion engine that includes an intake manifold from which fuel-air mixture is drawn into combustion chambers and within which a vacuum as created during operation of the engine. Supplying a fuel-air mixture to the fuel manifold is a carburetion system within which the quantity of mixture supplied is selectively varied and the ratio between fuel and air is selectively changed. In response to load upon and operating speed of the engine, a control signal representative thereof is developed. The auxiliary energy supply system includes a blending chamber having an inlet and an outlet and through which a blend of fuel and air may be drawn. A conduit is coupled at one end to the manifold exclusive of the carburetion system and is coupled at its other end to the chamber outlet. Effectively disposed in the conduit is a metering valve that responds to the control signal for controlling the amount of the blend drawn from the outlet and through the conduit by the engine vacuum. Associated with the blending chamber is an atomizing throat that has a fuel intake port, an air input port and an outlet port coupled to the chamber inlet. The drawing of the blend from the chamber outlet in turn draws air through the input port and into comminglement with liquid fuel delivered through the intake port and atomized by action of the throat. Air is delivered to the input port and liquid fuel is delivered to the intake port.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
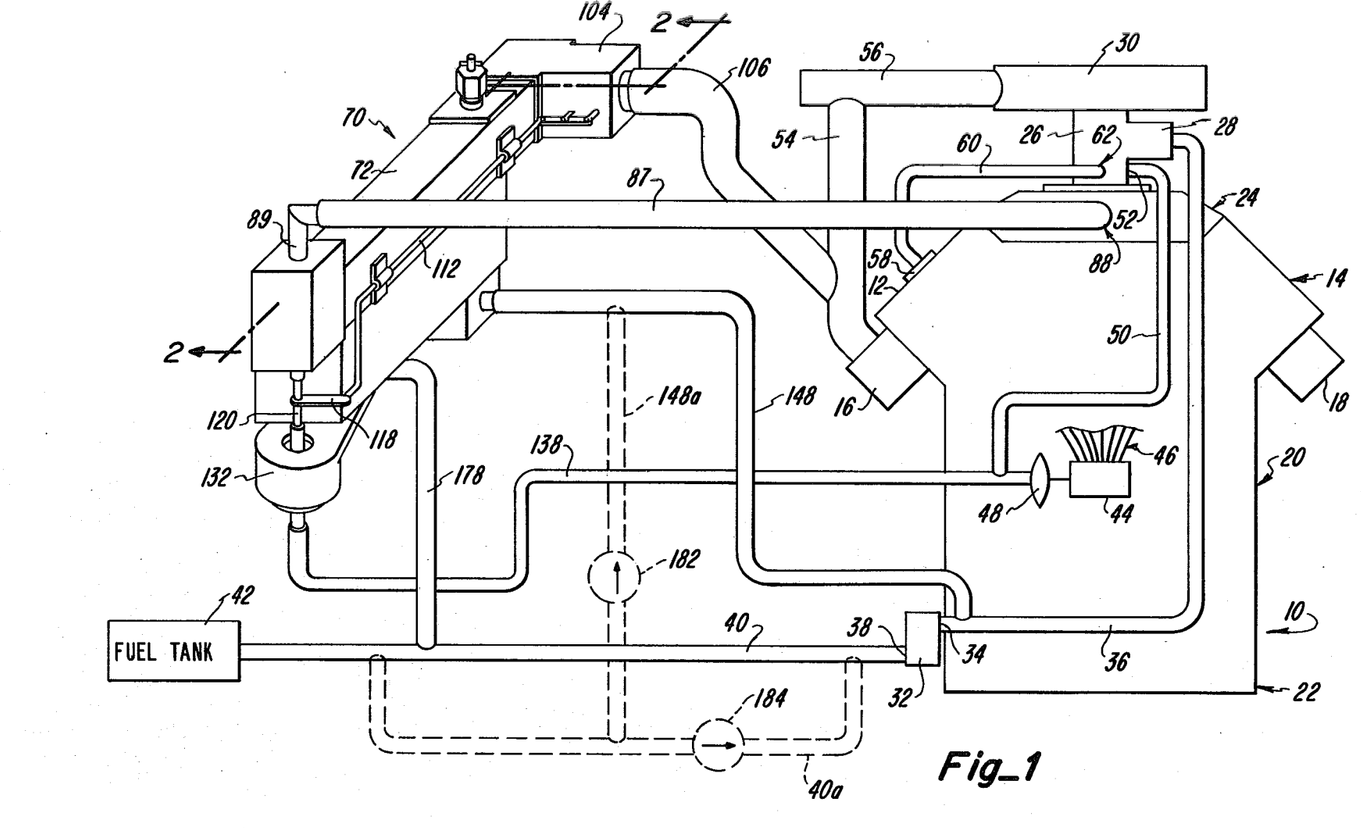
FIG. 1 is a diagrammatic view of an internal combustion engine to which an embodiment of the present invention has been adapted and also illustrating, by phantom-line presentation, one available alternative arrangement.

In FIG. 1, an internal combustion engine 10 is depicted only in outline form, because the type, make, model and even vintage is not essential to the implementation of the present invention. Exemplary of such engines are those of standard manufacture identified below in performance tables. As shown, it is of the V-type with opposing cylinder heads 12 and 14 each having its own respective one of exhaust manifolds 16 and 18. Heads 12 and 14 are secured on top of a block 20 beneath which is a crankcase 22.

Located above cylinder heads 12 and 14 and in valved communication therewith is an intake manifold 24 on which is mounted a carburetor 26 that conventionally includes a float chamber 28. Atop carburetor 26 is an air filter 30. Mounted on engine 10, and driven either electrically or mechanically by operation of the engine itself, is a fuel pump 32 which has a pressure output 34 connected by a fuel line 36 that leads into float chamber 28. The suction input 38 of pump 32 is connected by another fuel line 40 into the reservoir of fuel stored in a fuel tank 42.

Also mounted on engine 10 and operated thereby is a distributor 44 which supplies a high-voltage potential by means of a plurality of ignition wires, indicated at 46, connected in a proper firing order to a plurality of spark plugs (not shown) installed individually in the different combustion chambers defined in block 20. To achieve the usual variation in engine timing, as between different speed conditions, distributor 44 is conventionally advanced and retarded in rotational position with respect to cyclic operation of the pistons within the combustion chambers. Performing that task is a vacuum motor 48 which has an input passage effectively connected by a vacuum line 50 to manifold 24. As specifically shown, line 50 is connected to a fitting at 52 which projects into the interior of carburetor 26 at a lower portion thereof to communicate openly with manifold 24 and at a location whereat the carburetor mixture exists in its completed form.

As so far described, operation and performance of engine 10 is entirely conventional and well known. Moreover, the construction of carburetor 26 is unmodified from that which is specified as standard by the engine manufacturer. While a wide variety of carburetors are in themselves known, at least essentially all include certain basic components of which the carburetor shown in U.S. Pat. No. 4,033,712—Morton is an example. For the purposes of presenting that example, the latter patent is incorporated herein by reference, and the improvements disclosed by that patent need not be included for present purposes.

Thus, the carburetor includes a central bore in which is defined a throat and through which air is drawn by the vacuum developed in the intake manifold. Fuel from the float chamber is emitted into the throat by Venturi effect as the air is drawn toward the intake manifold. This results in a commingling of atomized particles of the fuel with the air so as to develop what is commonly referred to as the "mixture". The total quantity of mixture permitted to enter the manifold is controlled by a valve located below the throat and ordinarily operated by the vehicle driver through manipulation of an accelerator pedal. Disposed above the throat is another valve commonly called the "choke". Upon being moved toward a closed position, the choke, of course, decreases the amount of air admitted for a given quantity of fuel delivered into the throat, so as to result in what is termed a "richer" mixture. During cold weather operation, initial starting of the engine is usually facilitated by at least partially closing the choke valve. To that end, most modern engines operate the choke valve position by means of a bi-metal spring or other temperature-sensitive actuator which responds to engine temperature and correspondingly adjusts the position of the choke valve.

Operation of engine 10 has remained basically the same for many years. Once assembled and installed, the only adjustments normally made and used on carburetor 26 are the control of the choke and throttle valves. Of course, many refinements have been added over the years in an effort to improve performance. One which is illustrated is the provision of a heat riser tube 54 connected from a location adjacent to exhaust manifold 16 and into a snout or horn 56 which admits ambient external air and supplies that air through filter 30 and into carburetor 26. Heat from tube 54 warms the air admitted to the carburetor, and thereby the resultant mixture, so as to contribute to an increase in ultimate fuel vaporization obtained. The lower end of heat riser tube 54 typically opens into a loose shroud which surrounds exhaust manifold 16 and from which heat therefrom rises through tube 54 by convection and chimney effect.

Another modification found today in at least most vehicle engines is an arrangement for achieving what is called positive crankcase ventilation or PCV. This arrangement includes a check valve 58 typically seated in an opening through a cover which encloses the mechanism that operates the intake valves to govern the successive delivery of fuel-air mixture periodically into the different combustion chambers and the exhaust valves to correspondingly outlet the spent gases into the corresponding exhaust manifold. A hose 60 is connected at one end to valve 58 to permit vapor flow therefrom effectively into intake manifold 24 as by being connected to a suitable fitting 62 in this case physically located at the bottom of carburetor 26 in the same manner as fitting 52. The vacuum developed within manifold 24 serves to draw vapors produced during operation within crankcase 22 through the different passages provided in block 20 for the valve operators or stems. Those vapors are drawn back into intake manifold 24 and thus so recycled as to be burned further upon subsequent ignition within the combustion chambers.

The auxiliary energy supply system 70 of the embodiment of the present invention principally illustrated in FIG. 1 may be adapted to engine 10 merely by the interconnection of several different conduits, lines or pipes all of which may be in the form of flexible rubber hoses or the like. The new supply system itself preferably is contained within an integrally-formed cabinet 72 from which various fittings project for attachment of the aforementioned hoses. Cabinet 72 may be mounted at any suitable and convenient location within an engine compartment of a vehicle, for which purpose an appropriately-shaped bracket (not shown) may be supplied.

Figure 2:
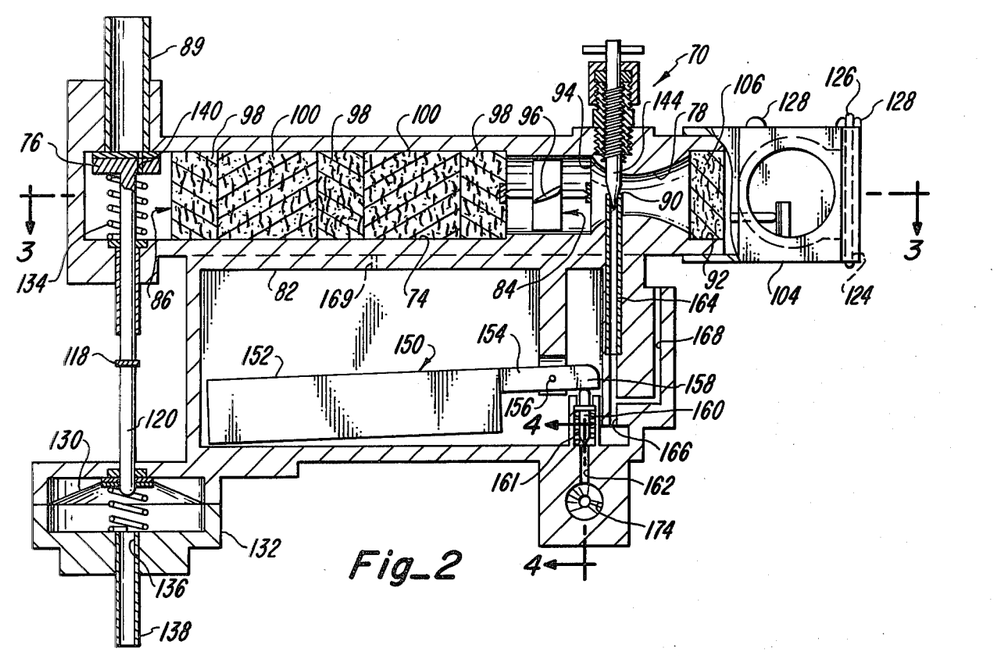
FIG. 2 is a fragmentary cross-sectional view taken along the line 2—2 in FIG. 1.
Figure 3:
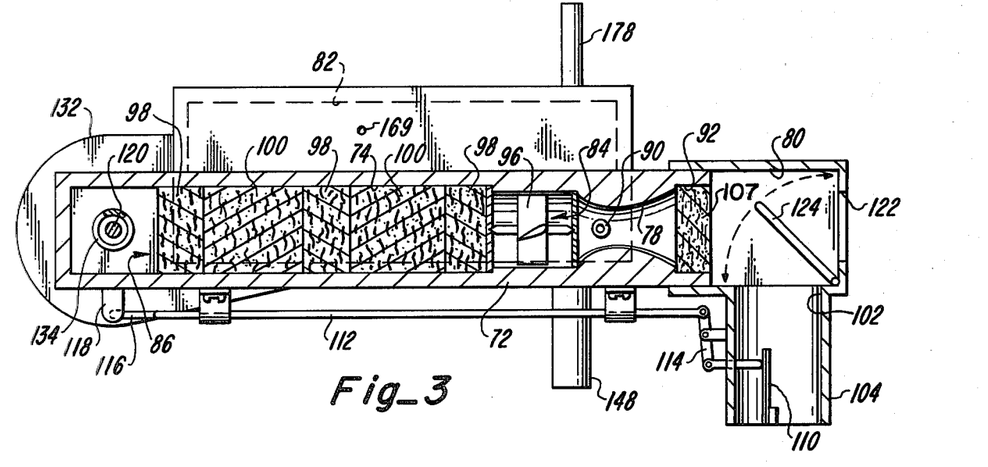
FIG. 3 is a fragmentary cross-sectional view taken along the line 3—3 in FIG. 2.

With more particular reference to FIGS. 2 and 3, defined within cabinet 72 is a blending chamber 74, a metering valve 76, an atomizing throat 78, an air entrance 80 and a float cavity 82 which, in this case, serves as a part of means for delivering liquid fuel to the unit. Blending chamber 74 has an inlet 84 and an outlet 86 through which a blend of fuel and air may be drawn. A conduit 87 is coupled at one end 88 to intake manifold 24 and, at least in effect, exclusive of carburetor 26. Conduit 87 is coupled by a fitting 89 at its other end, by way of valve 76, to outlet 86; thus valve 76 is effectively disposed in conduit 87. When open, valve 76 admits the negative pressure of the vacuum created within intake manifold 24, and communicated by way of conduit 87, the valve serving to control the amount of the blend drawn from outlet 86 and through conduit 87 by the vacuum and in response to a control signal representative of that vacuum as will be seen.

Throat 78 has a fuel intake port 90, an air input port 92 and an output port 94 directly coupled to and in this case actually the same as inlet 84. The drawing of the blend from outlet 86 serves to draw air through input port 92 and into commingement with liquid fuel delivered through intake port 90 and atomized by action within throat 78 in the same manner, as such, that fuel is atomized and mixed within the throat of primary carburetor 26 of engine 10.

Within blending chamber 74, however, the commingled mixture delivered into inlet 84 is subjected to action which increases the fusion of the fuel particles, atomized in throat 78, with the accompanying air. The action is one of achieving coalescence of the fuel and air as a result of which the fuel component of the blend appears to be vaporized at least to a large extent. To the end of increasing the degree of coalescence, a turbine having vanes 96 preferably is disposed in chamber 74 adjacent to inlet 84 and is free to rotate in response to the drawing of the blend through chamber 74. Vanes 96 thereupon serve to churn the combination of fuel and air which arrives at the turbine.

In addition, porous barriers are disposed within chamber 74 to define tortuous paths for the flow of the combination of fuel and air drawn through the chamber. As part of such a barrier system, a plurality of foam plastic or porous bronze pads 98 are spaced successively along the length of chamber 74. Each pad 98 in itself presents a multiplicity of small tortuous paths therethrough. Situated between each successive pair of pads 98 is a body 100 of shavings of a material which is inert to both the fuel and the air as well as any moisture contained therein. Found to be particularly suitable for this purpose are minute shavings of stainless steel obtained as a by-product of the metalworking of that material in connection with the fabrication of other products. Each collection of the shavings serves to define an additional matrix of individual, very small tortuous paths. At the same time, the comparatively high heat conductivity of the stainless steel material serves to increase uniformity of temperature across the flow path within chamber 74 and of the combination of the fuel and air components.

Coupled to a first opening 102 into entrance 80 is a heat tube 104. Tube 104 is connected by a hose 106 to a source of heated air. Conveniently in this case, hose 106 leads into heat riser tube 54 associated with exhaust manifold 16, so as to derive heat therefrom in the same manner as already described above with respect to the conduction of heat to snout 56. In operation, the heated air is conducted through opening 102 and a foam plastic filter 107 into throat 78 and on into cavity 74. By radiation and convection, the heat energy within the air serves to heat the fuel components jointly being drawn through the cavity.

Disposed within the path of the heated air in tube 104 is a thermostat 110 having a bi-metal element which senses the temperature of the heated air delivered to input port 92 and responds by moving a latch arm 112 through a bell crank 114. The outer end 116 of arm 112 captures a keeper 118 secured to a stem 120 which serves as the operator of valve 76. When the air delivered into tube 104 is below a selected temperature, so that the temperature within chamber 74 is below a corresponding value, valve 76 is held in a closed position by the disposition of arm end 116 under keeper 118; this overrides other action, to be explained, that seeks to open valve 76. When the air supplied through hose 106 and tube 104 reaches a temperature which results in that level, however, thermostat 110 operates bell crank 114 to pull arm 112 and its end 116 away from keeper 118, thereby permitting valve 76 to open when otherwise appropriately operated.

As indicated above, the choke on primary carburetor 26 conventionally is operated automatically to increase the ratio of fuel to air in the carburetor mixture until a temperature level associated with engine 10 increases to a predetermined value at which time the choke valve is opened fully. In implementing the instant auxiliary supply system, the operational characteristic of thermostat 110 is selected to pull arm 112 away from keeper 118 when the temperature of the heated air supplied through tube 104 reaches a value that corresponds approximately with the temperature value at which the choke valve in carburetor 26 is opened.

The shroud on riser tube 54 which effects coupling of hose 106 to receive heated air from the vicinity of exhaust manifold 16 or elsewhere is sufficiently loose fitting or "leaky" to insure that the quantity of heat delivered ultimately into chamber 74 is not excessive. When adjusted according to its specifications to operate properly, absent the addition of the present system, engine 10 exhibits a particular volumetric efficiency in response to the supply to manifold 24 of only the mixture from carburetor 26. With that in mind, the purpose of the "loose" coupling of heat tube 106 to a source of heat is to insure that the quantity of heat ultimately delivered to the combination of fuel and air in chamber 74 is less than that which would be sufficient to substantially reduce the volumetric efficiency within engine 10 when the blend is drawn into manifold 24 from cavity 74.

A second opening 122 into entrance 80 serves as a source of ambient air. Also included within entrance 80 is a manually-controlled shutter valve 124 which may be latched in either of two positions so as to determine which of openings 102 and 122 are coupled to input port 92 at any given time. During cold weather operation, shutter 124 is moved into a position to close external opening 122 and thereby permit the entry into entrance 80 of only the heated air. During warm weather operation, on the other hand, shutter 124 is moved to its other position in which opening 102 is blocked, so that the incoming air then must enter through opening 122. To latch shutter 124 into either position, its hinge pin projects through the wall of entrance 80 and is bent into a lever 126 which may be detented into depressions in appropriately located nubs 128. For use in climates which are warm the year around, entrance 80 may be entirely omitted along with heat tube 104, hose 106, thermostat 110, keeper 118 and the linkage which serves through arm 112 to latch the keeper.

Metering valve 76 is carried on one end of stem 120 the other end of which is secured to a diaphram 130 of a vacuum motor 132. In the absence of operation of vacuum motor 132, valve 76 is biased by a compression spring 134 into a closed condition. The input passage 136 of motor 132 is coupled by a vacuum line 138 to the source of vacuum porvided by intake manifold 24. That is conveniently accomplished in the illustrated arrangement by inserting a suitable T-fitting at the control input side of distributor vacuum motor 48 so as to communicate with the vacuum established in vacuum line 50 which leads to manifold 24. Instead of a vacuum motor, however, an electrically energized solenoid or motor unit may be used to operate valve 76. That unit may be actuated by any speed representative parameter such as vacuum, engine revolutions per minute or throttle linkage position.

Vacuum motor 132 operates to open metering valve 76 in response to a control signal which in this case is an increase in the developed vacuum beyound a selected level that corresponds to an increase in the speed of engine 10 to a value greater than its idle speed or that is otherwise developed by the imposition of an overload on engine 10 in an amount that tends to stall its operation. Preferably extending through valve 76 is a small bypass 140 which permits the passage ultimately to intake manifold 24, when valve 76 is in its closed condition, of a small quantity of the blend developed in chamber 74 in an amount which is substantially less than the quantity of that blend drawn into manifold 24 when valve 76 is in its open condition.

Associated with intake port 90 and within throat 78 is a manually adjustable needle valve 144 which serves to selectively govern the rate of delivery of fuel from intake port 90. Again as initially adjusted and "tuned" to operate in accordance with applicable specifications for its normal condition of operation, and when responding only to the feeding into manifold 24 of the mixture from carburetor 26 as in the absence of the present auxiliary system, measurements on the exhaust from engine 10 will reveal a predetermined quantity of pollutant material therein. After installation of the auxiliary system herein described, the only adjustment usually required to achieve the benefits sought is that of manipulating needle valve 144. The amount by which valve 144 is opened is selected to reduce, to substantially less than the originally measured quantity without operation of the new system, the amount of the pollutant material exhausted by the engine when the blend is drawn from chamber 74 into manifold 24.

The measurements of the exhaust gases produced by engine 10 preferably are taken with the engine powering a dynamometer or other test device, so as to be operating under a normal condition of power delivery. Valve 144 then is simply adjusted as to degree of its opening and closing until the quantity of the pollutant material measured is at least very much reduced and preferably is minimized. When it is not convenient to use such a test facility, a rough estimate can be obtained by holding a white absorbent paper in front of the exhaust outlet and adjusting valve 144 to an opening less than that at which deposits begin to increase over a given time interval. A condition of maximized engine speed for a given throttle setting corresponds at least approximately to best fuel efficiency and pollution reduction.

Figure 4:
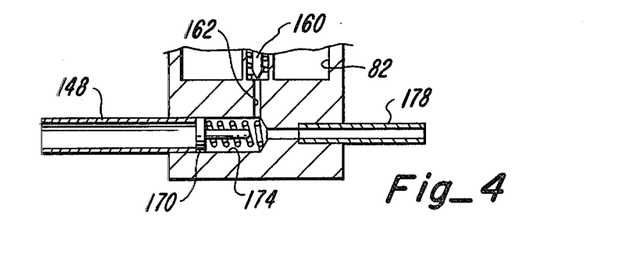
FIG. 4 is a fragmentary cross-sectional view taken along the line 4—4 in FIG. 2.

In accordance with the embodiment as initially under discussion herein, intake port 90 is effectively coupled, through float cavity 82 and by a fuel line 148, to pressure output 34 of fuel pump 32. Thus, fuel pump 32 serves to supply fuel both to float chamber 28 of carburetor 26 and to the new auxiliary system. Disposed within cavity 82 is a float valve 150 which includes a hollow float 152 affixed at one end to a lever 154 pivoted at 156 and continuing into an arm 158 which presses against the stem of a valve 160 held lightly in a normally open position by a compression spring 161. Valve 160 opens and closes an intake opening 162 to maintain a normal level within cavity 82 of fuel received from pressure output 34. Connected from and at one end defining intake port 90 is a tube 164 that projects downwardly within cavity 82 so as to have an effective lower end 166 which is disposed within the fuel beneath its normal upper level to constitute an outlet opening from cavity 82. An air vent 168 opens to the surrounding atmosphere and leads into an extending portion of tube 164 at a location below the normal fuel level in cavity 82. Another relief air vent 169 opens from the external atmosphere into the top of cavity 82 above that normal fuel level. Vent 168 introduces a slight amount of air, in the form of small bubbles, into the raw fuel. In an alternative that also has performed well, vent 168 leads into tube 164 from a point above the level of the raw fuel in cavity 82. This sucks in a small amount of fuel vapor and is in lieu of the provision of vent 169. Consequently, fuel stored within cavity 82 is drawn from intake port 90 by action of throat 78 in response to the vacuum in conduit 87 that draws air through input port 92.

Preferably, fuel line 148 is coupled to intake opening 162 through a check valve 170 effectively disposed in line 148 so as to enable the flow of fuel only toward opening 162. Valve 170 opens into an open enclosure 174. Besides opening 162, also leading outwardly from another opening in enclosure 174 is a line 178 which serves as a relief flow path and is connected, as by use of a T-fitting, between suction input 38 of pump 32 and enclosure 174. Compared to the internal diameter of fuel line 148, relief line 178 has an internal diameter to define a lesser flow capacity.

In operation, check valve 170 serves to prevent the occurrence of a back flow of fuel from enclosure 174 during recovery movement of diaphram 130. The bypass provided by relief line 178 serves to permit a continuous recycling of fuel back into pump 32 and reduces the load which otherwise would be imposed upon pressure output 34 of pump 32 when valve 160 is in the closed condition.

It will be observed that the provision of float 152 and its operation within cavity 82 serves to maintain a constantly available source of fuel for suction into tube 164 and delivery at intake port 90 entirely independent of pressure pulses developed by pump 32. Consequently, adjustment of control valve 144 is independent of the effects of variations in engine speed that may affect the pressure at the output from the pump 32. It also will be observed that cavity 82 constitutes a small reservoir of fuel in addition to the main reservoir present within fuel tank 42.

In an alternative, the fuel to be delivered from intake port 90 is obtained by suction directly from the reservoir within fuel tank 42. In that case, the entire float mechanism contained within cavity 82 is omitted as is the cavity itself, enclosure 174 and check valve 170 together with their associated components. Instead, tube 164 is connected by way of a fuel line 148a through a check valve 182 to an alternate fuel supply line 40a which leads from fuel tank 42 to suction input 38 of fuel pump 32. Included within alternate fuel line 40a is another check valve 184, and the suction inlet side of check valve 182 is connected to a junction between fuel tank 42 and check valve 184, while the latter is connected in series between that junction and suction input 38. Check valve 182 enables the flow of fuel from tank 42 within pipe 148a in a direction only toward intake port 90. It serves to prevent any possibility of air being delivered from intake port 90 and along line 148a so as to arrive at suction input 38 and thereby cause starvation of the latter for fuel. Check valve 184 enables the flow of fuel from tank 42 only in a direction toward pump 32. It serves to prevent any back surge of fuel from pump 32, upon the recovery stroke of diaphram 130, which otherwise might cause an undesired pressure spurt of fuel to be forced from intake port 90.

Figure 5:
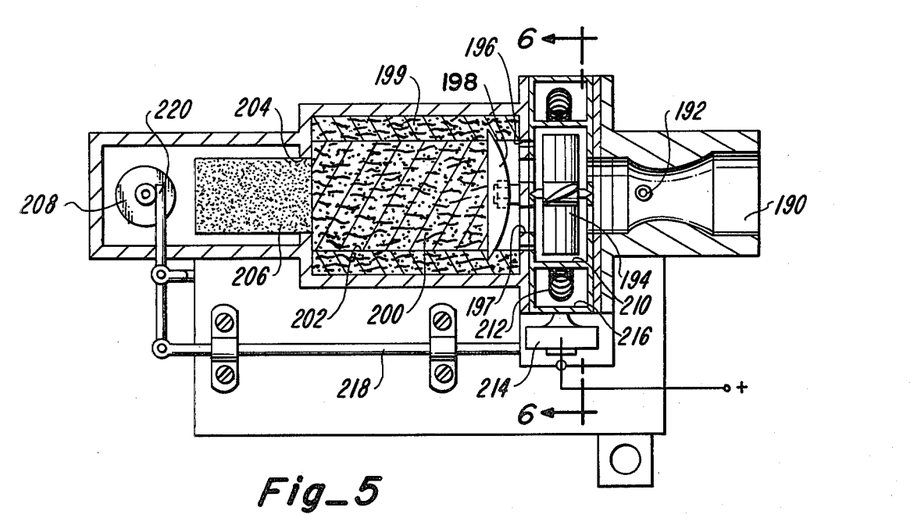
FIG. 5 is a longitudinal cross-sectional view of an alternative embodiment.
Figure 6:
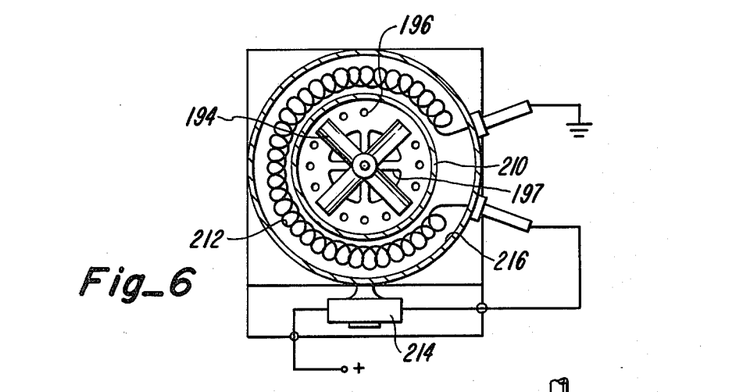
FIG. 6 is a cross-sectional view taken along the line 6—6 in FIG. 5.

Numerous other alternatives may be incorporated for different ones of the features discussed. For example, a resistance-heating element may be associated with blending chamber 74 for the purpose of increasing the degree of fuel vaporization. One embodiment to that end is shown in FIGS. 5 and 6. Air is drawn into a throat 190 where it is combined with fuel from an intake 192. That mixture then turns and is churned by a turbine 194 after which it passes through a peripheral plurality of minute openings 196 or a central opening 197 and is deflected around the periphery of a facing concave disc 198. The blend is then drawn through part of a filter element 199 and back toward the central axis through a porous filter 200. Element 199 in this case is a foam acrylic inert to the blend, as is the case with all such filters, and filter 200 is a packed mass of metallic shavings. The blend then exits the defined chamber 202 through an outlet 204 and traverses a microscopically porous bronze filter 206. The final blend is drawn by the vacuum past open vacuum-responsive control valve 208 and conducted into the intake manifold.

Surrounding turbine 194 is a heat-conductive metal ring 210 surrounded by a resistance heating element 212. A thermostat 214 senses the heating in the chamber 216 that encloses element 212 and, upon the reaching of a temperature level corresponding to the heated condition, operates a lever system 218 that frees a latch 220 from valve 208 and allows the latter to open.

In operation, the lighter elements of the atomized mixture are vaporized in the air and tend to follow a generally central path through turbine 194 and opening 197. The heavier, unvaporized, fuel particles are thrown by the turbine impellers against ring 210 which has a temperature of between 200° and 225° F. Those heavier parts are vaporized on contact with ring 210 and that vapor is ducted through openings 196. Disc 198 diverts all of the flow of the blend into element 199. Preferably, heating element 212 is energized through the ignition switch for the engine.

Figure 7:
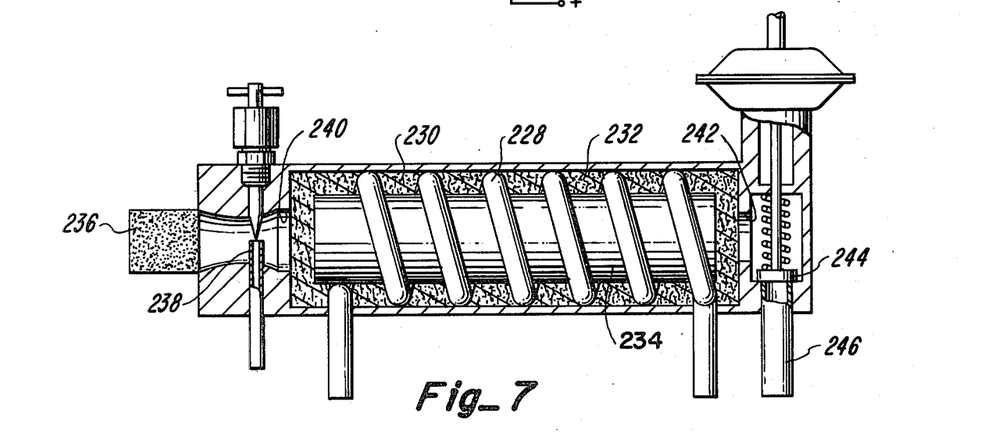
FIG. 7 is a longitudinal cross-sectional view of still another alternative embodiment.

In one still different version as shown in FIG. 7, heated coolant (e.g., 192° F.) was conducted to and from the engine cooling system and through a spiral conduit 228 within a chamber 230 and alongside which conduit the combined fuel and air was drawn through a body of stainless steel shavings 232 and around a plug 234. Air from an inlet 236 was atomized with fuel from an intake 238 and then entered chamber 230 through an opening 240. The resulting blend exited by way of an outlet 242 to a vacuum-controlled valve 244 as before. On passing valve 244, the blend was led to the intake manifold by a hose 246.

That version of FIG. 7 operated satisfactorily during moderate climatic temperature conditions. In below-freezing weather, however, it was initially found necessary to insulate thoroughly the entire auxiliary apparatus in order to obtain adequate performance. On the other hand, in very warm weather it was found that the amount of heat conveyed to the blend was sufficiently excessive that poor performance was achieved as a result of the consequent reduction in volumetric efficiency within the engine. With the housing constructed to afford such insulation, however, and the location of air inlet 236 away from the very hot air near the engine, it is feasible to employ heat from hot water or any other appropriate source for the purpose of satisfactorily elevating the temperature of the delivered blend. Nevertheless, and at least partly for simplicity of installation, the versions of the earlier figures presently are preferred.

Metering valve 76 is itself closed, as indicated above, during idle or almost stall load conditions of engine operation. Absent the inclusion of the function obtained from valve 76, it has been found that the resultant overall ratio as between fuel and air within intake manifold 24 is excessively lean during those conditions. In turn, that tends to produce excessive internal heat within engine 10 itself.

In the following table, improvement in fuel economy or mileage obtained for a given fuel consumption is listed for several different makes of automobiles. For each, the engine model is identified. All measurements were made under conditions of normal and similar highway driving. A third column lists the fuel economy in terms of miles per gallon (mpg) achieved with each engine adjusted in accordance with its specifications but without the addition of the present auxiliary system. The next column lists the fuel economy with the auxiliary system installed and adjusted as described above. The last column sets the percentage of increase in fuel economy obtained.

| Make of Auto | Engine | Normal Hwy. MPG | MPG With System | % Increase in MPG |
| --- | --- | --- | --- | --- |
| 1977 Ford F250 Pickup Truck | 460 CI V 8 | 10.3 | 16.32 | 58.45 |
| 1977 Subaru | 1600 CC 4 cyl | 35.12 | 43.65 | 24.43 |
| 1963 Chevrolet | 6 cyl | 17.1 | 27.68 | 61.87 |
| 1974 Chevrolet Vega | 4 cyl | 23.1 | 37.77 | 63.35 |
| 1974 Mazda | Rotary | 16.5 | 27.31 | 65.51 |

The additional table now to be set forth illustrates the reduction in pollution achieved. These results were more difficult to obtain because, although independent testing laboratory facilities were used and significant exhaust pollutants were observed with the engines adjusted according to specifications and without operation of the present auxiliary system, the performance of the auxiliary system represented such a dramatic improvement when it also was operated that the professional instrumentation was insufficiently sensitive as calibrated to provide entirely reliable measurements from a quantitive sense. Qualitatively, however, it was abundantly evident that the pollution levels were most substantially reduced and minimized. In the following table, the different columns, following the vehicle identification, set forth the comparative measurements of the different pollutant materials which were investigated. Those were hydrocarbons (HC) as expressed in parts per million (PPM) and carbon monoxide (CO) as expressed in percent (%). As can be seen, the values determined were substantially less than standards set by the Environmental Protection Agency which at least recently were 350 parts per million for hydrocarbons and 5% for carbon monoxide.

| Test Vehicle | HC | CO |
| --- | --- | --- |
| 1977 Blazer | 80 PPM | 1% |
| 1972 Vega | 30 PPM | 0.5% |
| 1976 Vega | 50 PPM | 2% |
| 1976 Mazda | 140 PPM | 2% |
| 1974 Mazda | 61 PPM | 1.2% |

It will be apparent that the auxiliary system is fully capable of being incorporated along with the internal combustion engine as a component of original equipment manufacture. On the other hand, it is just as easily adapted to an existing engine. All that is basically required for the latter in most cases is the installation of a T-fitting to obtain the necessary supply of fuel and of another T-fitting which is installed in a convenient vacuum line for securing the operation of motor 132. When required, heated air may be obtained from a shroud which is simply pressed over the exhaust manifold; alternatively, a hole may be formed into the existing shroud for heat tube 54 or in that tube itself.

In older engines, conduit 87, which conveys the blend, may be coupled, again by the use of a T-fitting for example, into any existing vacuum line. Alternatively, of course, a hole could be drilled in the bottom of the carburetor throat and a suitable fitting installed. In most present day engines, however, an easy mode of installation is simply to install a T-fitting or the like in hose 60 of the positive crankcase ventilation system. The remote end of conduit 87 is then simply connected into that fitting. It will be observed that, in most cases, installation will require nothing more than perhaps a knife for cutting into existing hoses and a screwdriver to tighten clamps about the couplings of added fittings.

Essentially the entire auxiliary system, and particularly the entirely of cabinet 72, may be of a one-piece molded construction. Motor 132 is a standard vacuum-advance motor for distributor usage and the remaining components are easily formed. Thus, the entire assembly may be produced with significant economy both as to cost of materials and labor involved during manufacture and ultimate assembly.

Most importantly, however, the leading attribute of the described auxiliary system is that of achieving both a substantial increase in fuel economy and at the same time substantially reducing exhaust pollutants. While the exact mechanism, or combination of mechanisms, fully responsible for these results has not been fully proved, it seems apparent that the increased consistency and coalescence, probably at least with substantial fuel vaporization, results in very significantly increased completion of combustion within the engine chambers. Consequently, there is greater efficiency of burning to obtain energy from the fuel. At the same time, the combustion products remaining are substantially reduced in quantity.

While particular embodiments of the invention have been shown and described, and various alternatives and modifications have been indicated, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:

1. For use with an internal combustion engine that includes:

an intake manifold from which fuel-air mixture is drawn into combustion chambers and within which a vacuum is created during operation of said engine;

a carburetion system for supplying a fuel-air mixture to said manifold;

means for selectively varying the quantity of said mixture supplied by said system to said manifold;

means for selectively changing the ratio between fuel and air in said mixture supplied by said system;

and means responsive to load upon and speed of operation of said engine for developing a control signal respresentative thereof;

an auxiliary energy supply system comprising:

a chamber having an inlet and an outlet and an atomizing throat through which a combination of fuel and air may be drawn essentially only from said atomizing throat;

means separate from the atomizing throat and disposed within said chamber for blending said combination of fuel and air;

a conduit coupled at one end to said manifold exclusive of said carburetion system and coupled at its other end essentially only to said outlet;

a metering valve effectively disposed in said conduit and responsive to said control signal for controlling the amount of the blended combination drawn from said outlet and through said conduit by said vacuum;

said atomizing throat having a fuel intake port, an air input port and an output port with said output port being coupled to said inlet, the drawing of the blended combination from said outlet in turn drawing air through said input port and into comminglement with liquid fuel delivered through said intake port and atomized by action of said throat;

means for delivering air to said input port;

and means for delivering liquid fuel to said intake port.

2. A supply system as defined in claim 1 which further includes coalescence means, disposed in said chamber, for increasing fusion of said fuel and air.

3. A supply system as defined in claim 2 in which said coalescence means includes a turbine disposed in said chamber and rotatable in response to the drawing of said blend through said chamber for churning the combination of said fuel and air therein.

4. A supply system as defined in claim 2 in which said coalescence means also includes at least one tortuous-path porous barrier disposed in said chamber in the path of the combination of said fuel and air drawn therethrough.

5. A supply system as defined in claim 4 in which said barrier includes a body of porous material inert to said fuel.

6. A supply system as defined in claim 4 in which said barrier includes a body of shavings of a material inert to said fuel and air.

7. A supply system as defined in claim 1 which includes heating means for delivering heat to the fuel and air in said blended combination.

8. A supply system as defined in claim 7 in which said heating means delivers heated air into said input port.

9. A supply system as defined in claim 1 which includes means for sensing the temperature of air delivered through said input port and means responsive to said sensing means for effectively overriding said control signal and maintaining said valve in an at least substantially closed condition when the temperature within said chamber is below a selected value.

10. A supply system as defined in claim 9 in which said changing means effects an increase in the ratio of fuel to air in said mixture until a temperature level associated with said engine increases to a predetermined value, and in which said selected value corresponds approximately with said predetermined value.

11. A supply system as defined in claim 7 in which said engine exhibits a predetermined volumetric efficiency in response to supply to said manifold of only said mixture, and in which the quantity of said heat delivered to said combination is less than an amount sufficient to substantially reduce said volumetric efficiency when said blend is drawn into said manifold.

12. A supply system as defined in claim 1 in which said air delivery means includes a first source of air heated by said engine and a second source of ambient air, and which further includes means for selectively determining manually which of said first and second sources is coupled to said input port.

13. A supply system as defined in claim 1 in which said metering valve is biased to a closed condition in the absence of a predetermined level of said vacuum.

14. A supply system as defined in claim 13 in which said metering valve includes a bypass permitting passage to said manifold, when said valve is in said closed condition, of a quantity of the blended combination substantially less than the quantity of said combination drawn into said manifold when said valve is in an open condition.

15. A supply system as defined in claim 1 in which said control signal is said vacuum, which further includes a vacuum motor having an operator coupled to said metering valve and an input passage coupled directly to said manifold, and in which said motor opens said metering valve in response to an increase of said vacuum beyond a selected level.

16. A supply system as defined in claim 1 in which said fuel delivering means includes an adjustable valve for selectively governing the rate of delivery of said fuel to said intake port.

17. A supply system as defined in claim 16 in which said engine exhausts a predetermined quantity of pollutant material under a normal condition of operation in response to supply to said manifold of only said mixture, and in which the amount of opening of said adjustable valve is selected to reduce, to substantially less than said predetermined quantity, the quantity of said pollutant material exhausted by said engine when said blend is drawn into said manifold.

18. A supply system as defined in claim 1 in which said fuel delivering means includes means for selectively governing the rate of delivery of said fuel to said intake port.

19. A supply system as defined in claim 18 in which said engine exhausts a predetermined quantity of pollutant material under a normal condition of operation in response to supply to said manifold of only said mixture, and in which said rate of delivery is selected to reduce, to substantially less than said predetermined quantity, the quantity of said pollutant material exhausted by said engine when said blend is drawn into said manifold.

20. A supply system as defined in claim 1 which includes a reservoir of said fuel and a pipe coupled at its one end into fuel within said reservoir and coupled at its other end to said intake port;
and further including a pump for delivering fuel from said reservoir to said carburetion system and having an input passage coupled into a junction in said pipe.

21. A supply system as defined in claim 20 which further includes a check valve in series with said pipe between said junction and said intake port and enabling flow of said fuel in said pipe in a direction only toward said intake port.

22. A supply system as defined in claim 20 which further includes a check valve in series with said passage between said junction and said pump for enabling flow of said fuel in said passage only toward said pump.

23. A supply system as defined in claim 1 which includes a reservoir of said fuel and a pump having a suction input coupled to fuel within said reservoir and a pressure output of said fuel, and which further includes means for coupling fuel from said pressure output to said fuel intake port.

24. A supply system as defined in claim 23 in which said pressure output also is coupled to said carburetion system and delivers said fuel thereto.

25. A supply system as defined in claim 23 in which said coupling means includes:
a housing defining a cavity having a fuel intake opening;
a float valve disposed in said cavity for opening and closing said intake opening to maintain a normal level in said cavity of fuel received from said pressure output, said cavity having an outlet opening disposed in said fuel beneath said normal level and coupled to said intake port;
and a vent leading into said cavity, fuel from said cavity being drawn from said intake port by action of said throat in response to said drawing of air through said input port.

26. A supply system as defined in claim 25 in which said coupling means further includes a check valve disposed in a line between said pressure output and said intake opening for enabling flow of said fuel only toward said intake opening.

27. A supply system as defined in claim 26 in which said coupling means also includes a relief flow path from a junction, between said check valve and said intake opening, and said suction input, said flow path having a flow capacity less than the flow capacity of said line.

* * * * *